(12) United States Patent
Chang et al.

(10) Patent No.: US 8,602,444 B2
(45) Date of Patent: Dec. 10, 2013

(54) FOLDABLE HAND CART

(75) Inventors: Wen-Tung Chang, Jiaoxi Township Yilan County (TW); Edwin Ho, Irvine, CA (US)

(73) Assignee: Seville Classics Inc., Torrance, CA (US)

( * ) Notice: Subject to any disclaimer, the term of this patent is extended or adjusted under 35 U.S.C. 154(b) by 27 days.

(21) Appl. No.: 13/315,645

(22) Filed: Dec. 9, 2011

(65) Prior Publication Data
US 2013/0147163 A1 Jun. 13, 2013

(51) Int. Cl.
*B62B 3/00* (2006.01)
(52) U.S. Cl.
USPC ............................. 280/652; 280/651; 280/655
(58) Field of Classification Search
USPC .............. 280/652, 639, 655, 40, 47.29, 646, 280/47.315, 47.24, 38, 47.27, 47.18, 651
See application file for complete search history.

(56) References Cited

U.S. PATENT DOCUMENTS

| | | | | |
|---|---|---|---|---|
| 4,969,660 A | * | 11/1990 | Spak | 280/646 |
| 5,312,006 A | * | 5/1994 | Lag | 280/47.29 |
| 5,348,325 A | * | 9/1994 | Abrams | 280/40 |
| 5,803,471 A | * | 9/1998 | DeMars et al. | 280/40 |
| 5,984,327 A | * | 11/1999 | Hsieh et al. | 280/47.24 |
| 6,053,514 A | * | 4/2000 | Su | 280/40 |
| 7,097,183 B1 | * | 8/2006 | Su | 280/47.29 |
| 7,140,635 B2 | * | 11/2006 | Johnson et al. | 280/646 |
| 7,387,306 B2 | * | 6/2008 | Zimmer | 280/47.29 |
| 7,441,785 B1 | * | 10/2008 | Tsai | 280/47.29 |
| 2004/0150195 A1 | * | 8/2004 | Robberson et al. | 280/652 |
| 2004/0180184 A1 | * | 9/2004 | Fillion et al. | 428/211.1 |

* cited by examiner

*Primary Examiner* — Hau Phan
(74) *Attorney, Agent, or Firm* — Raymond Sun

(57) ABSTRACT

A hand cart has a frame having a left vertical member and right vertical member, each vertical member having a top end that is coupled to a handle bar, and a bottom end that has a pin extending therefrom. The hand cart also includes a left wheel assembly and a right wheel assembly, each wheel assembly having a tubular housing that receives a portion of a vertical member, and a wheel secured to the tubular housing, with each tubular housing having a spiral slot that receives the pin of the corresponding bottom end for movement within the slot. A carrier plate has a left seat and a right seat, each seat pivotably connected to a corresponding bottom end of a vertical member.

6 Claims, 6 Drawing Sheets

FOLDABLE HAND CART

BACKGROUND OF THE INVENTION

1. Field of the Invention

The present invention relates to a wheeled hand cart that is used to carry articles around, and whose wheels and carrier plate can be folded for storage.

2. Description of the Prior Art

Hand carts are well-known in the art. These hand carts have been used to assist the user in moving heavy objects around.

One example of a conventional hand cart is shown and described in Taiwan Patent No. M318556. Unfortunately, the conventional hand carts, including the hand cart described in this patent, suffer from a number of drawbacks.

First, when the hand cart is not in use, the carrier plate often rests on the ground, taking up valuable space and presenting a hazard. Specifically, if the hand cart falls, it can damage surrounding items or hurt passing individuals.

Second, many of the conventional hand carts cannot be folded or collapsed into a smaller configuration for storage. By collapsing the hand cart, one would save space and the collapsed hand cart would pose less of a hazard. However, the folding and collapsing often requires the hand carts to assume complex mechanical constructions that are either expensive, or are difficult for the user to effectuate the collapsing.

Therefore, there is a need for a foldable hand cart that is simple in construction, and yet easy to operate.

SUMMARY OF THE DISCLOSURE

In order to accomplish the objectives of the present invention, the present invention provides a hand cart having a frame having a left vertical member and right vertical member, each vertical member having a top end that is coupled to a handle bar, and a bottom end that has a pin extending therefrom. The hand cart also includes a left wheel assembly and a right wheel assembly, each wheel assembly having a tubular housing that receives a portion of a vertical member, and a wheel secured to the tubular housing, with each tubular housing having a spiral slot that receives the pin of the corresponding bottom end for movement within the slot. A carrier plate has a left seat and a right seat, each seat pivotably connected to a corresponding bottom end of a vertical Member. Each seat has two sidewalls that define a space therebetween for receiving the corresponding bottom end, with each sidewall having a first stop surface adjacent to and perpendicular to the plane of the carrier plate, a second stop surface parallel to the plane of the carrier plate, and a curved surface connecting the first and second stop surfaces. A spring is seated inside each tubular housing and positioned around a portion of the corresponding bottom end. The lower end of each tubular housing is adjacent the first stop surface of the corresponding seat when the carrier plate and the wheels are pivoted against the frame, and the lower end of each tubular housing is adjacent the second stop surface of the corresponding seat when the carrier plate and the wheels are pivoted away from the frame.

DETAILED DESCRIPTION OF THE PREFERRED EMBODIMENTS

Figure 1:
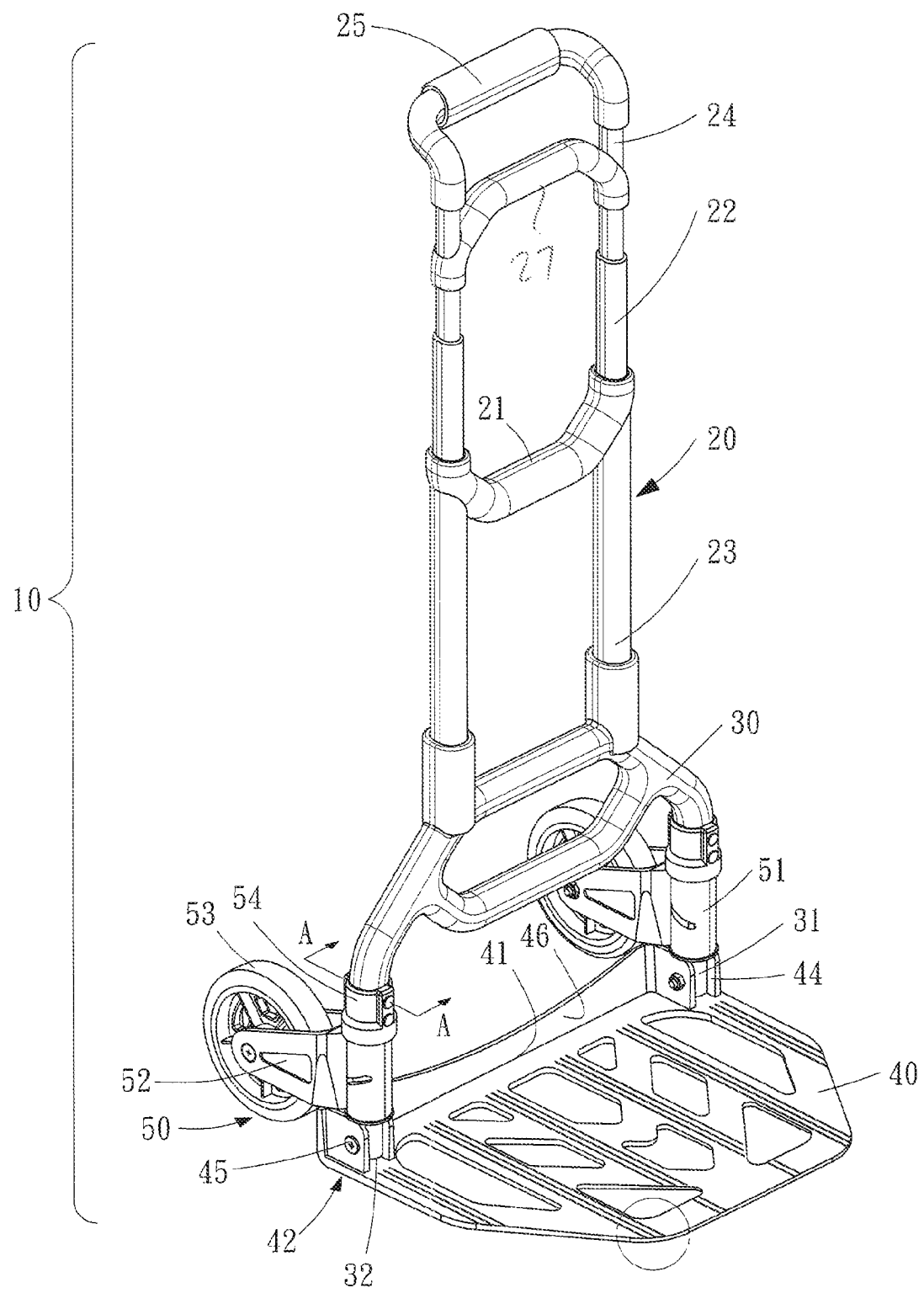
FIG. 1 is a perspective view of a hand cart according one embodiment of the present invention.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

FIGS. 1-6 illustrate one embodiment of a hand cart 10 according to the present invention. The hand cart 10 has a frame 20 that couples a carrier plate 40 and two wheel assemblies 50. The frame 20 includes a telescoping assembly that comprises two sets of telescoping upper and lower pole members 24 and 22, respectively. The lower end of each upper member 24 is received into the upper end of each corresponding lower member 22, and the lower end of each lower member 22 is received inside corresponding links 23 that are secured to the upper portion of a chassis 30. A connecting bar 21 connects the lower members 22 to provide stability between the two sets of telescoping members. A handle bar 25 is secured to the top ends of the upper members 24. An actuating bar 27 is provided below the handle bar 25, linking the upper members 24.

The chassis 30 has a central bar from which two vertical legs 31 extend on each side thereof. The legs 31 are vertical to each other, and has a bottom free end 32.

Figure 2:
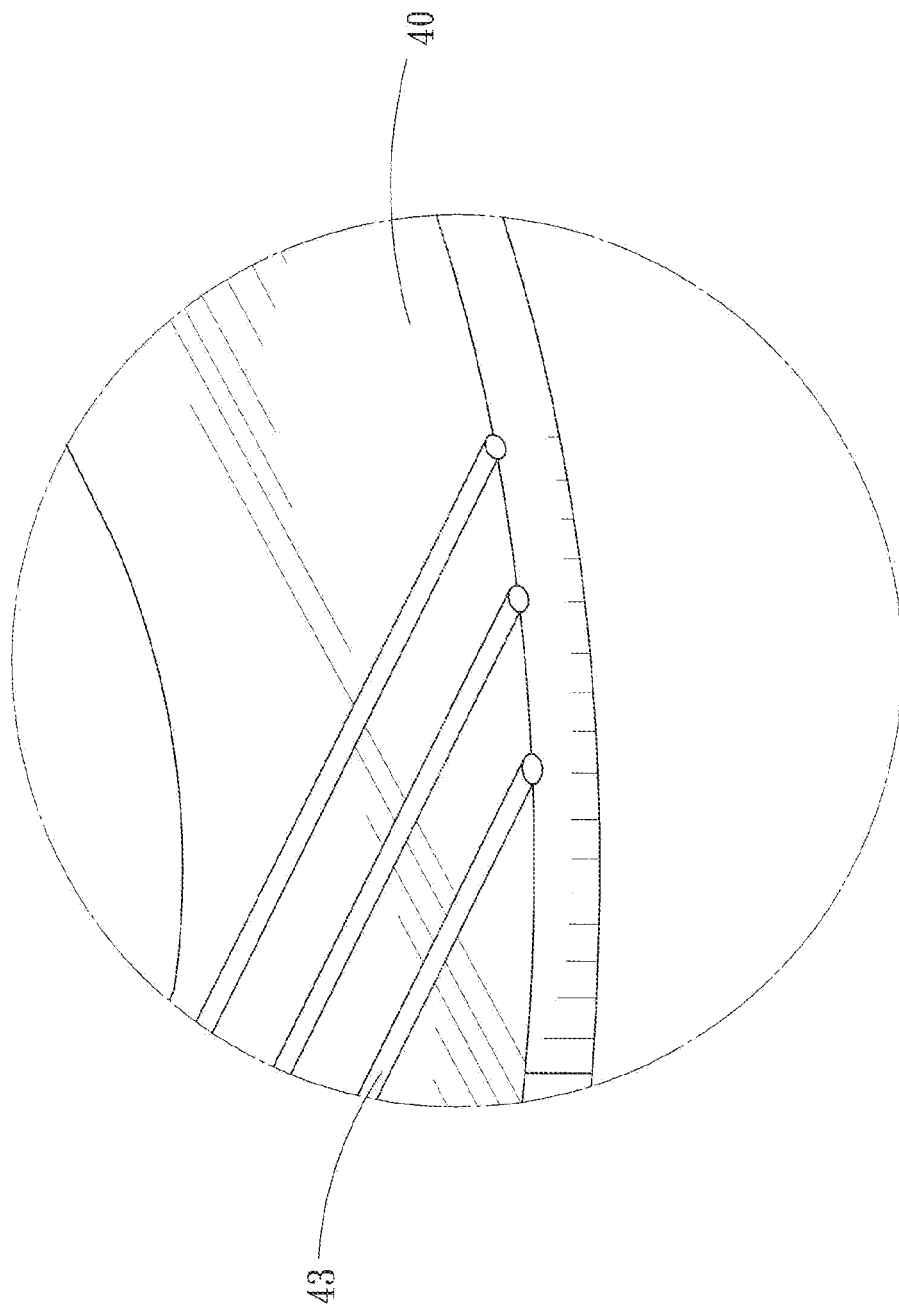
FIG. 2 is an enlarged view of the circled area in FIG. 1.

Referring to FIG. 2, the carrier plate 40 has a tactile surface layout 43 that functions to increase the friction coefficient and provide an uneven surface to prevent items placed thereon from sliding.

Figure 3:
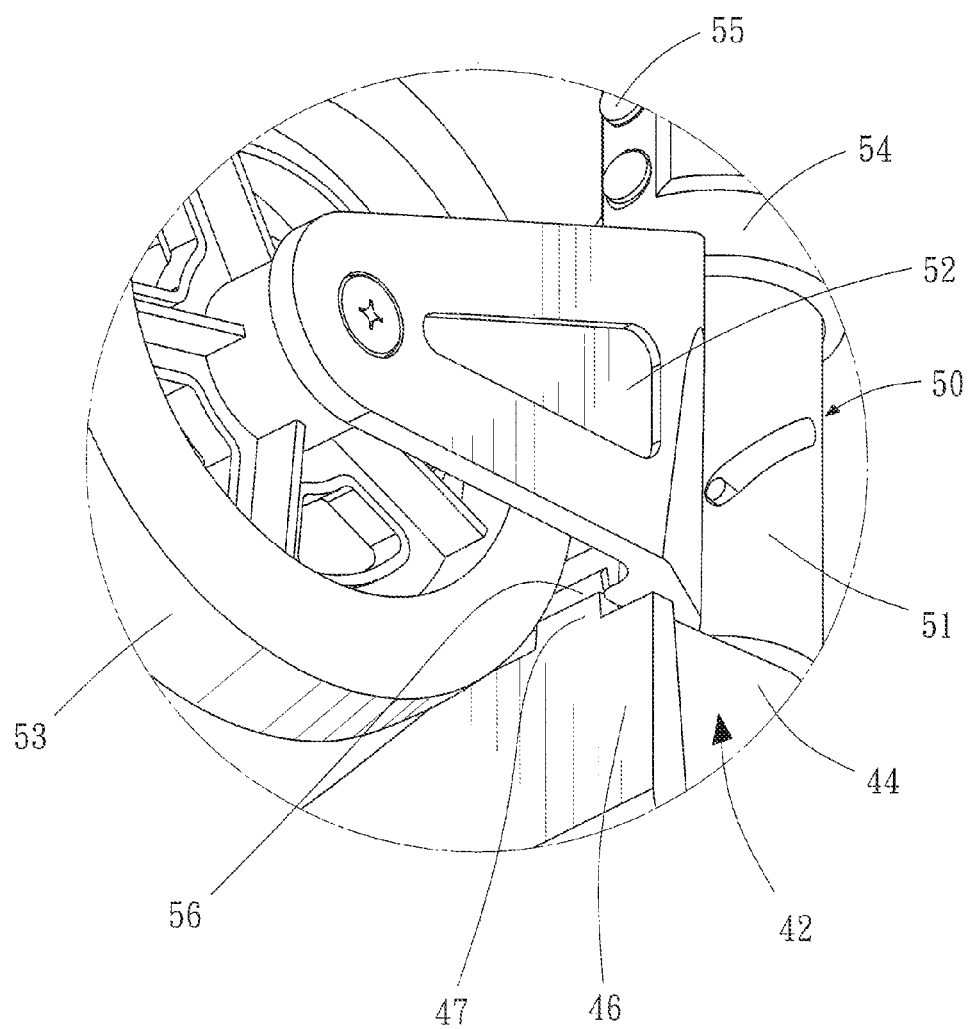
FIG. 3 is an enlarged perspective view of the wheel base.

Referring now to FIGS. 1 and 3, the carrier plate 40 can have a polygonal configuration with a rear edge 41 two side edges, a front edge, and two angled edges that connect a corresponding side edge with the front edge. Openings can be provided in the carrier plate 40. A vertical wall 46 extends vertically from the rear edge 41. A seat 42 is provided on the carrier plate 40 at each opposing end of the rear edge 41. Each seat 42 has two sidewalls 44 that define a receiving space for holding the bottom free end 32 of one leg 31. A hinge bolt 45 extends through the sidewalls 44 and corresponding leg 31 at each seat 42 to secure the bottom free end 32 to the seat 42. A tab 47 extends from the top of the rear edge 41 adjacent each seat 42.

Figure 4:
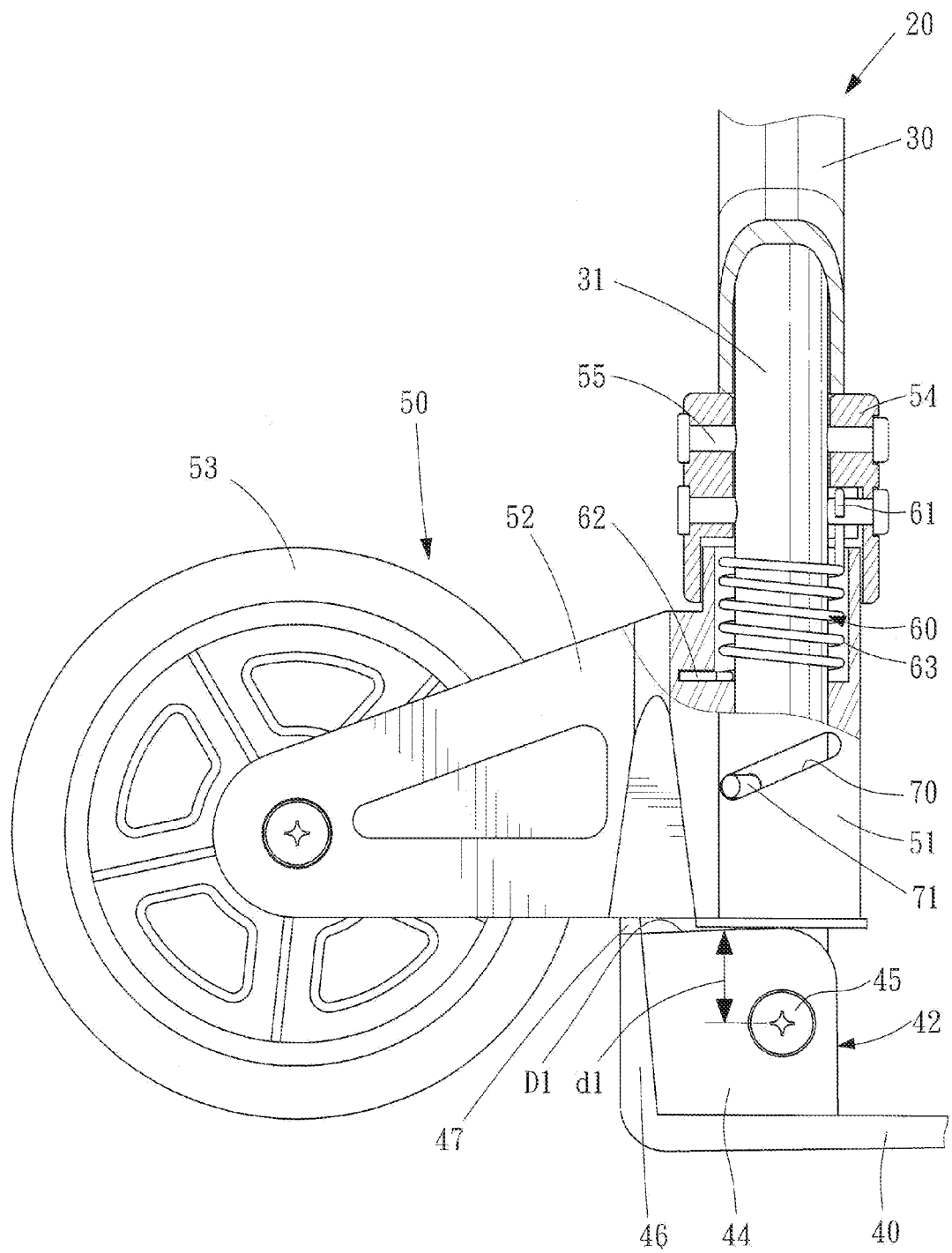
FIG. 4 is an enlarged view of the wheel base with a partial cross-sectional view taken along the line A-A of FIG. 1.

Referring also to FIGS. 3 and 4, each wheel assembly 50 has a tubular housing 51, with a recess 56 provided at the bottom of the tubular housing 51. Two wings 52 extend from each tubular housing 51, with the wings 52 defining a space therebetween for receiving a wheel 53. Each leg 31 extends through the bore of the tubular housing 51 into the seat 42.

A ring cover 54 is positioned above each tubular housing 51, and is secured to the leg 31 by fasteners 55. A torsion spring 60 is seated inside a well 63 (of the tubular housing 51), and is wrapped around each leg 31 inside the well 63 at the location of the tubular housing 51. One end 61 of the spring 60 is hooked around a fastener 55 inside the ring cover 54, and the other end 62 of the spring 60 is secured inside the tubular housing 51. Thus, the spring 60 normally biases the ring cover 54 towards the tubular housing 51.

A spiral or curved slot 70 is provided in the wall of each tubular housing 51, and a pin 71 is received for movement inside each slot 70. Each pin 71 extends from the corresponding leg 31.

In the normal use position, the spring 60 biases the ring cover 54 downwardly, and each pin 71 is positioned at the bottom (or lower-most portion) of the corresponding slot 70. In this use position shown in FIG. 1, the wheels 53 are opened and the carrier plate 40 is generally perpendicular to the frame 20 and the chassis 30. The tabs 47 are received in the corresponding recesses 56. The bottom of the tubular housings 51 rests against one edge D1 of the sidewalls 44, with the edge D1 acting as a stop surface against the natural bias of the springs 60.

Figure 5:
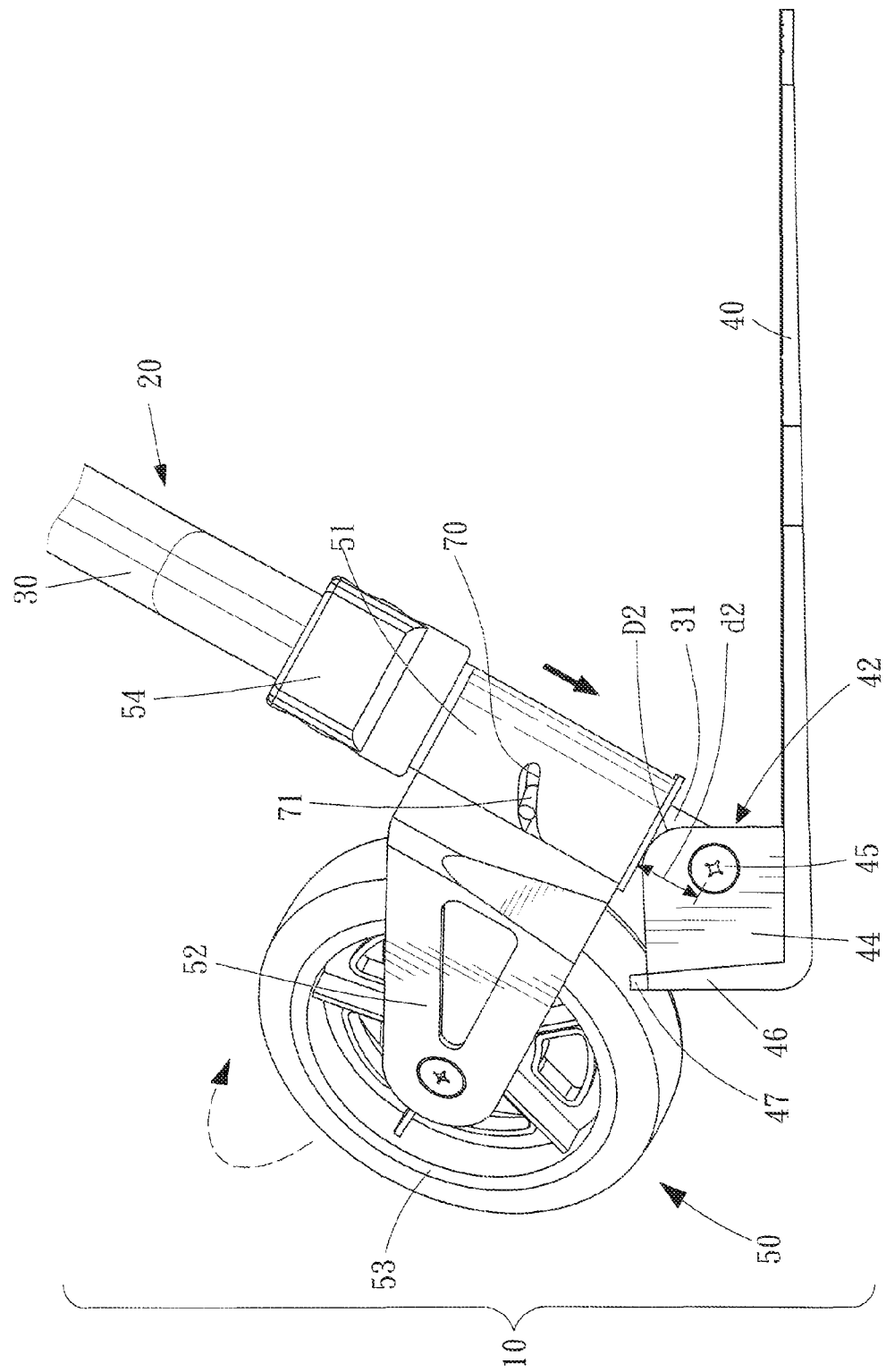
FIGS. 5 and 6 are side views illustrating the folding action of the wheel base.
Figure 6:
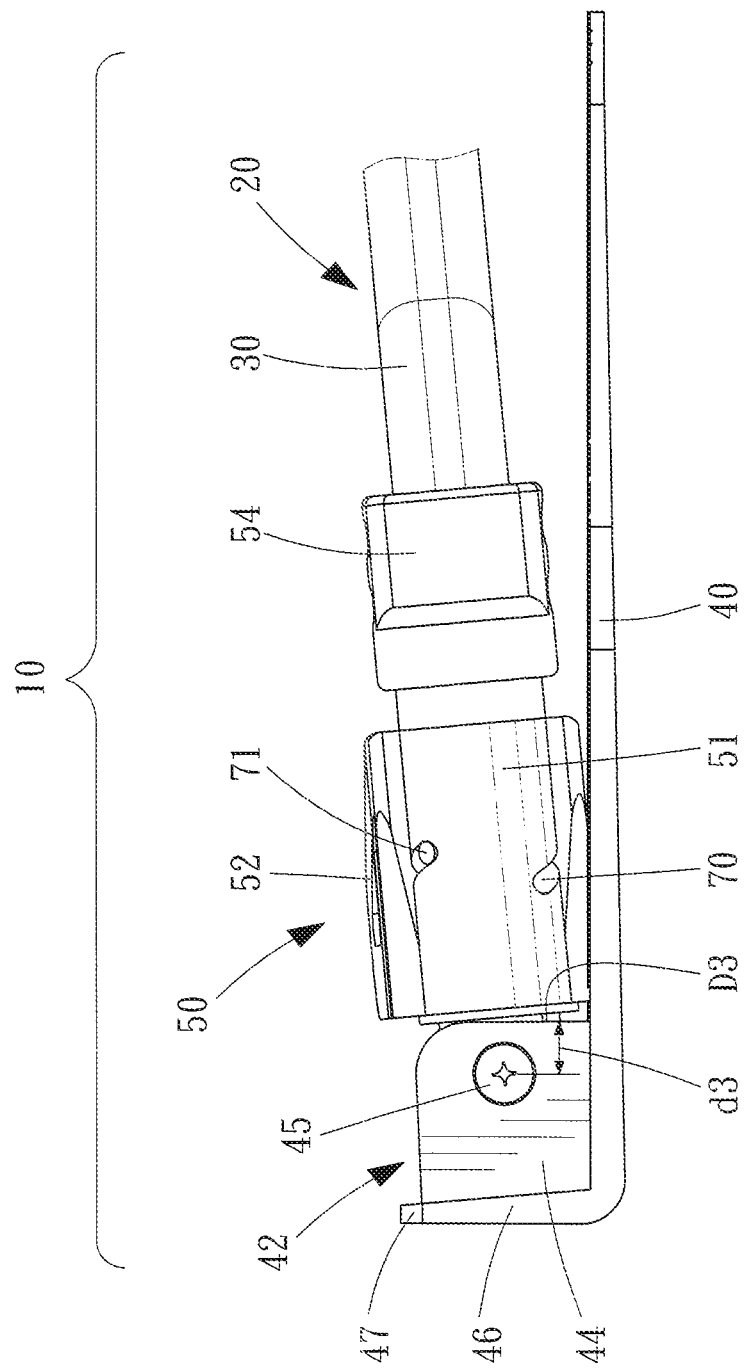

When the user wishes to collapse the hand cart 10 for storage, the user pulls the actuating bar 27 upwardly while simultaneously pressing the handle bar 25 downwardly (if needed), and then pushes the carrier plate 40 towards the chassis 30. Thus causes the bottom of the tubular housings 51 to travel, or pivot around a curved corner D2 (see FIG. 5) of the sidewalls 44, thereby causing the corresponding tubular housing 51 to rotate inwardly so that the bias of the springs 60 will pull the wings 52 and the wheels 53 to rotate inwardly towards the wall 46. As shown in FIG. 5, this causes each pin 71 to travel upwardly along the corresponding slot 70. This rotation also causes each tab 47 to be disengaged from the corresponding recess 56. When the wheels 53 have been folded against the wall 46 and the carrier plate 40 has been folded against the chassis 30 (see FIG. 6), the bottom of the tubular housings 51 is adjacent another edge D3 of the sidewalls 44, and the pins 71 are adjacent the top of the slots 70. The edge D3 also acts as a stop surface.

To open the carrier plate 40 and wheels 53, the user merely pulls the carrier plate 40 away from the chassis 30 (against the natural bias of the springs 60), causing the bottom of the tubular housings 51 to move from the edge D3 about the curved corner D2 to the other edge D1 of the sidewalls 44. The pins 71 will travel downwardly along the slots 70 until they reach the bottom (or lower-most portion) of the corresponding slot 70. This movement will also cause the wheels 53 to pivot outwardly away from the wall 46.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A hand cart, comprising:
a frame having a left vertical member and right vertical member, each vertical member having a top end that is coupled to a handle bar, and a bottom end that has a pin extending therefrom;
a left wheel assembly and a right wheel assembly, each wheel assembly having a tubular housing that receives a portion of a vertical member, and a wheel secured to the tubular housing, each tubular housing having a spiral slot that receives the pin of the corresponding bottom end for movement within the slot, each tubular housing further includes a lower end;
a carrier plate having a left seat that is pivotably connected to the bottom end of the left vertical member, and a right seat pivotably connected to the bottom end of the right vertical member, each seat having two sidewalls that define a space therebetween for receiving the corresponding bottom end, with each sidewall having a first stop surface adjacent to and perpendicular to the plane of the carrier plate, a second stop surface parallel to the plane of the carrier plate, and a curved surface connecting the first and second stop surfaces;
a spring seated inside each tubular housing and positioned around a portion of the corresponding bottom end; and
wherein the lower end of each tubular housing is adjacent the first stop surface of the corresponding seat when the carrier plate and the wheels are pivoted against the frame, and the lower end of each tubular housing is adjacent the second stop surface of the corresponding seat when the carrier plate and the wheels are pivoted away from the frame.

2. The hand cart of claim 1, further including a ring cover positioned above each tubular housing, with the spring having one end secured to a portion of the ring cover and another end secured to the tubular housing.

3. The hand cart of claim 1, wherein the carrier plate has a rear wall.

4. The hand cart of claim 1, wherein the frame includes a chassis that has a left leg and a right leg, with the left leg defining the bottom end of the left vertical member and the right leg defining the bottom end of the right vertical member.

5. The hand cart of claim 1, wherein each wheel assembly includes a pair of wings extending from the tubular housing, with the wheel positioned between the wings.

6. The hand cart of claim 1, wherein each slot defines a first lower end and an opposite second upper end, and wherein the corresponding pin is adjacent the second upper end of the slot when the carrier plate and the wheels are pivoted against the frame, and the corresponding pin is adjacent the first lower end of the slot when the carrier plate and the wheels are pivoted away from the frame.

* * * * *